(12) United States Patent
Campbell

(10) Patent No.: US 6,631,230 B1
(45) Date of Patent: Oct. 7, 2003

(54) IMAGING APPLICATION USING COHERENT OPTICAL FIBER BUNDLE

(75) Inventor: Scott Patrick Campbell, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/745,854

(22) Filed: Dec. 22, 2000

Related U.S. Application Data
(60) Provisional application No. 60/171,849, filed on Dec. 22, 1999.

(51) Int. Cl.[7] .................................................. G02B 6/04
(52) U.S. Cl. ....................................... 385/121; 385/116
(58) Field of Search ................................. 385/121, 120, 385/116, 115

(56) References Cited

U.S. PATENT DOCUMENTS

| | | | | |
|---|---|---|---|---|
| 3,033,071 A | * | 5/1962 | Hicks, Jr. .................... 385/116 |
| 4,716,507 A | * | 12/1987 | Ames .......................... 362/311 |
| 4,820,010 A | * | 4/1989 | Scifres et al. ................ 385/121 |
| 5,313,542 A | * | 5/1994 | Castonguay ................. 385/115 |
| 5,412,745 A | * | 5/1995 | Weidman et al. ............. 385/43 |
| 5,471,215 A | * | 11/1995 | Fukuhara et al. ............. 342/70 |
| 5,760,852 A | * | 6/1998 | Wu et al. ...................... 349/14 |
| 5,864,644 A | * | 1/1999 | DiGiovanni et al. .......... 385/43 |
| 5,894,364 A | * | 4/1999 | Nagatani ..................... 385/120 |
| 5,930,433 A | * | 7/1999 | Williamson et al. ........ 385/121 |
| 6,021,241 A | * | 2/2000 | Bilbro et al. ................ 385/116 |
| 6,038,360 A | * | 3/2000 | Sugawara .................... 385/116 |
| 6,043,928 A | * | 3/2000 | Walker et al. ............... 359/337 |
| 6,311,001 B1 | * | 10/2001 | Rosine ........................ 385/120 |
| 2002/0096629 A1 | * | 7/2002 | Korein .................. 250/227.11 |

\* cited by examiner

*Primary Examiner*—Lynn Feild
*Assistant Examiner*—Hae Moon Hyeon
(74) *Attorney, Agent, or Firm*—Dickstein Shapiro Morin & Oshinsky, LLP

(57) ABSTRACT

A coherent optical fiber bundle is used in place of a lens for imaging. The input end of the bundle is shaped into the shape of a desired area for receiving light. The light is received and modified according to the shape. The other end can be flat and pressed directly against an image sensor.

21 Claims, 1 Drawing Sheet

IMAGING APPLICATION USING COHERENT OPTICAL FIBER BUNDLE

CROSS REFERENCE TO RELATED APPLICATIONS

This application claims the benefit of the U.S. Provisional Application No. 60/171,849, filed on Dec. 22, 1999.

BACKGROUND

Conventional imaging has relied on high-quality bulk optics for certain optical functions such as focusing and beam shaping. High-quality bulk optics can be expensive, and fragile, and can also limit the applications which can be carried out.

SUMMARY

The present application teaches optical imaging using optical fiber bundles.

BRIEF DESCRIPTION OF THE DRAWINGS

These and other aspects will now be described in detail with reference to the accompanying drawings, wherein.

DETAILED DESCRIPTION

Figure 1:
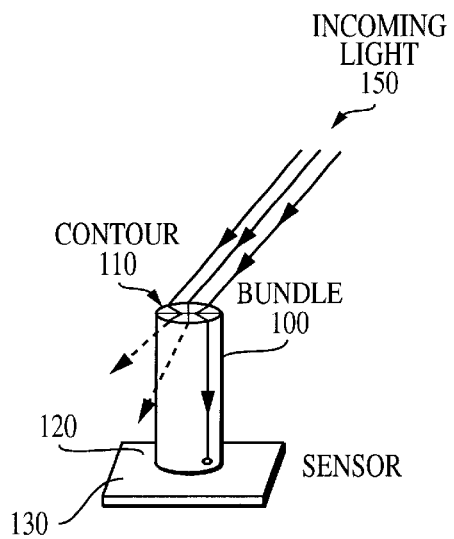
FIG. 1 shows a lens formed from a coherent optical fiber bundle with a contoured light receiving end.

FIG. 1 shows forming a lens using a coherent optical fiber bundle. An optical fiber bundle with a relatively low numerical aperture is used. The fiber bundle 100 may have a contoured input end 110, and a flat output end 120. The contoured end may be a convex or concave or slanted edge.

Flat output end 120 is abutted against a sensor 130 which can be an image sensor, e.g. a complementary metal oxide semiconductor, CMOS image sensor. For example, an active pixel sensor of the type disclosed in U.S. Pat. No. 5,471,215 may be used. The shape and arrangement of the input end of the fiber bundle determines its imaging properties. And, each of the fibers is substantially constant in diameter, and therefore the outer surface of the fiber bundle may be cylindrical, as shown.

FIG. 1 shows the lens with incoming light 150 which may be from a single direction as shown, or may be from many different directions, strikes the contoured end of the lens. The way that the light enters the fiber bundle is determined by Snell's law. Within each fiber of the bundle, only those beams that enter at a specific proper angle are guided by specified fiber of the bundle. Again this is all dictated by Snell's law, and can be mathematically modeled ray by ray. Each ray, from a different angle and/or different location, can be messed. By determining if each ray will be passed through the bundle or otherwise, the profile of the light can also be determined.

For example, each of a plurality of rays entering the specified contour can be handled in different ways depending on the contour of the input end.

The guided beams propagate down the bundle to the far end 120 which can be a flat end. Once exiting the flat end, the light is substantially immediately capture by the sensor 130.

Figure 2:
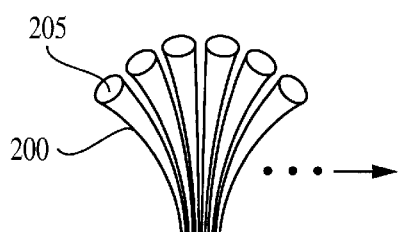
FIG. 2 shows a bundle of tapered fibers.
Figure 3:
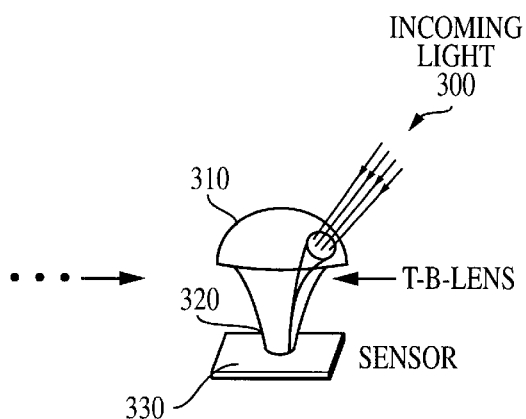
FIG. 3 shows a bundle formed from a group of tapered fibers.

Another embodiment is shown in FIG. 2. In the FIG. 2 embodiment, the bundle can include tapered fibers such as 200. Each tapered fiber has a thicker end 205 and thinner end 210. The bundle is formed by a tapered fiber. The entrance to the bundle may be at the end 205. The bundle itself is shown in FIG. 3. Incoming light shown as 300 is input to the input end 310 of the bundle. The output end 320 is again abutted against an image sensor 330. Therefore, the input end includes large diameter fibers, while the output end includes small diameter fibers. The rate of taper, as well as the contouring of the fibers, determines the imaging properties of the lens.

The imaging using this system depends on the shaping of the bundle. The input end is shaped and the output end may be flat. The input end can be convex, concave, angled, or any complex combination of all of these. Each input end can be modeled using numerical modeling to determine the result of the output.

While this system discloses the output end being flat, the output end can also be contoured or shaped in any desired way to meet any desired goal. For example, if the input surface of the sensor array is curved, then the bundle may also be correspondingly curved. In addition, this system can be used to obtain light from an angular location in which case the bundle may be curved instead of flat as shown.

Although only a few embodiments have been disclosed in detail above, other modifications are possible. All such modifications are intended to be encompassed within the following claims, in which:

What is claimed is:

1. A method of imaging light, comprising:
obtaining input light at a first end of a bundle of coherent optical fibers, said first end having a curved overall shape, receiving the input light and changing a profile of the light and carrying out a lensing action based on said curved shape; and
outputting said light at said second end with a changed profile.

2. A method as in claim 1, further comprising coupling an image sensor to said second end, such that said second end abuts directly against said image sensor, and receiving light on said image sensor corresponding to light which is coupled into said first end.

3. A method as in claim 2, wherein said second end is flat.

4. A method as in claim 3, wherein said second end is curved in a desired contoured shape.

5. A method as in claim 3, wherein said fibers are thicker at said first end than at said second end.

6. A lensless light changing system, comprising:
a fiber bundle, having a first end with a curved contour to cause a desired light changing effect to input light; and
an image sensor, adjacent said fiber bundle, said image sensor receiving light which has been shaped by said first end.

7. A system as in claim 6, wherein a second end of said fiber bundle is adjacent said image sensor.

8. A system as in claim 6, wherein said contour is a convex contour.

9. A system as in claim 6, wherein said contour is a concave contour.

10. A system as in claim 9, wherein said fiber bundle includes at least a plurality of fibers, and said fibers are tapered.

11. A system as in claim 6, wherein said image sensor is formed of complementary metal oxide semiconductor CMOS.

12. A system as in claim 6, wherein said image sensor is an active pixel sensor.

13. A system as in claim 6, wherein said contour is a concave contour, and said fiber bundle is substantially cylindrical in outer circumference.

14. A system as in claim 11, wherein said contour is a convex contour, and said fiber bundle is expanded in size at an input thereof as compared with said flat second end.

15. A system as in claim 6, wherein said first end has fibers with a different thickness than the same fibers on the second end.

16. A method of adjusting light characteristics, comprising:

obtaining an image receiving element which is to receive input light;

shaping a fiber bundle to have one end which is shaped into a curved contour to form a lensing effect and another end adjacent said image receiving element;

abutting an end of said fiber bundle against said image receiving element such that output light substantially immediately passes into said image receiving element; and using said fiber bundle to change a characteristic of light passing into said image receiving element.

17. A method as in claim 16, wherein said shaping comprises forming a first end with a convex shape.

18. A method as in claim 16, wherein said shaping comprises forming a first end with a concave shape.

19. A method as in claim 16, wherein said image receiving element is an image sensor.

20. A method as in claim 16, further comprising numerically modeling how light will be handled, and shaping said first end according to said numerically modeling.

21. A lensing system, comprising:

a coherent bundle of fibers, having a plurality of fibers therein which are dimensionally associated with one another, and having a first end which is shaped into a specified curved contour, which specified contour is adapted to carry out a specified light changing operation on input light, and having a second end and an image sensor, abutting against said second end.

* * * * *

UNITED STATES PATENT AND TRADEMARK OFFICE
CERTIFICATE OF CORRECTION

PATENT NO.    : 6,631,230 B1
DATED         : October 7, 2003
INVENTOR(S)   : Scott P. Campbell It is certified that error appears in the above-identified patent and that said Letters Patent is hereby corrected as shown below:

Column 1,
Line 55, replace "messed" with -- assessed --

Signed and Sealed this

Sixteenth Day of December, 2003

JAMES E. ROGAN
*Director of the United States Patent and Trademark Office*